INVENTOR
ALFRED A. KOPY

BY

ATTORNEYS

United States Patent Office 3,436,799
Patented Apr. 8, 1969

3,436,799
CUTTING TOOL
Alfred A. Kopy, Southfield, Mich., assignor to
Posa-Cut Corporation, Farmington, Mich.
Filed Sept. 6, 1966, Ser. No. 577,474
Int. Cl. B23p 15/28
U.S. Cl. 29—96
2 Claims

ABSTRACT OF THE DISCLOSURE

A rectangular shaped cutting tool having an upwardly, forwardly and sidewise opening V-shaped recess formed in one side face, with the edges of the V being uniformly sloped to form an acute angle with the inner wall of the recess, and a replaceable triangular shaped cutting insert formed of a hard, brittle metal, having its edges bevelled to correspond to the slope of said edges, vertically positioned in the recess and jammed downwardly and against the recess inner wall by both an upper releasable clamp and by cutting forces upon the exposed cutting corner of the insert. The uniform slope of the recess edges and its three openings permit the interchangeable use of inserts which are inaccurate or slightly variable in thickness and edge length.

This invention relates to a means for securing a throwaway type cutting insert within a tool holder.

In groove cutting tools, a cutting insert having a plurality of identical cutting edges is commonly employed. These throw-away cutting inserts are generally mounted in a tool holder assembly which provides the support and feeding and guiding means for the cutter itself. Under conditions of constant production use and resulting cutting edge wear, these cutting inserts must be frequently removed from the tool holder, to either bring a fresh cutting edge of the multi-edged insert into position or to replace the entire insert with a new one when all of the cutting edges have been used.

It is desirable that such replacement be accomplished quickly and easily, so as not to unnecessarily delay production. It is further desirable that such replacement be accomplished without the necessity of moving the tool holder itself, so that the cutting position will not be lost.

Accordingly, it is an object of this invention to provide an improved clamping means for a throw-away cutting insert which will firmly and positively secure the insert within a tool holder.

It is a further object of this invention to provide an improved clamping means for a throw-away cutting insert which permits the insert to be quickly and easily removed from the tool holder, while providing firm and positive locking of the insert in the clamped position.

It is another object of this invention to provide improved clamping means for a throw-away cutting insert which permits the insert to be removed from the tool holder without the necessity of changing the position of the tool holder.

These and other objects of this invention will become apparent from the following specification when considered in conjunction with the accompanying drawings.

Figure 1:
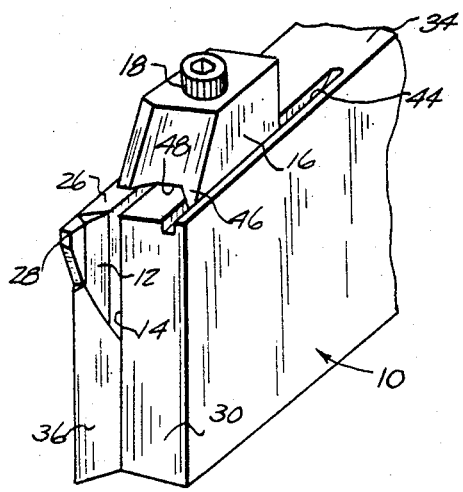
FIG. 1 is a front perspective view of the front portion of the tool holder assembly.
Figure 2:
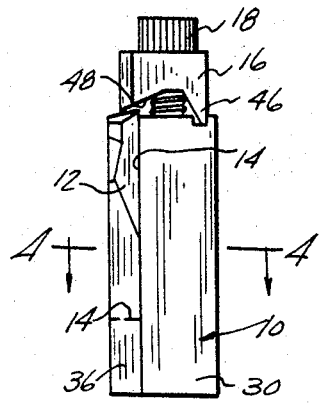
FIG. 2 is a front elevational view of the tool holder of FIG. 1.
Figure 3:
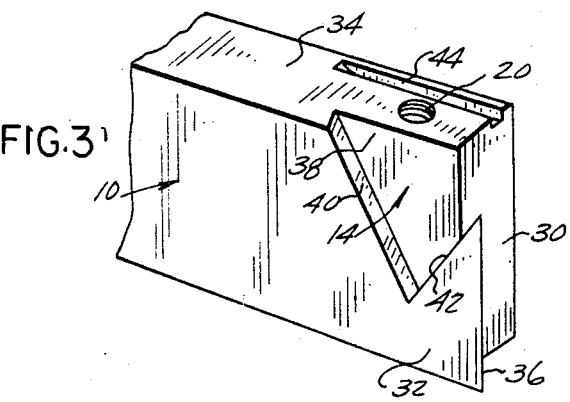
FIG. 3 is a front perspective view of the opposite side of the tool holder of FIG. 1, with the cutting insert and top clamp removed.

Referring now to FIGS. 1–3 of the drawings in particular, the invention generally comprises a tool holder 10 having a removable cutting insert 12 secured within an insert-receiving recess 14. Insert 12 is secured in place by means of top clamp 16 and screw 18 which is received by threaded hole 20 in tool holder 10.

Figure 5:
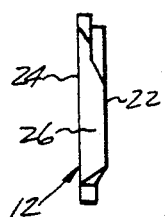
FIG. 5 is an end view of the cutting insert.
Figure 6:
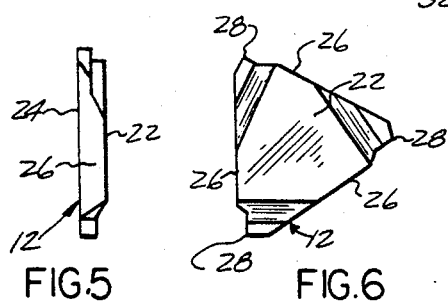
FIG. 6 is a side view of the cutting insert of FIG. 5.

The triangular cutting insert is illustrated in greater detail in FIGS. 5 and 6. It generally comprises inner and outer faces 22, 24, respectively, and three identical sides 26. This configuration provides three cutting edges 28. The various other illustrated beveled faces of the cutting insert do not form a part of this invention.

Referring now to the details of the tool holder itself, tool holder 10 comprises a front face 30, left side face 32, and top face 34. Front face 30 has a forwardly projecting portion 36, the purpose of which will be described hereinafter.

Insert-receiving recess 14 comprises a side wall 38 parallel to side face 32, and rear and front shoulders 40, 42 respectively. It will be noted from FIG. 4 that shoulders 40, 42 are undercut at a slight angle, preferably about 11 degrees.

A slot 44 is formed in tool holder top face 34 to receive a leg 46 of top clamp 16. A clamping face 48 is provided on the underside of top clamp 16, and is inclined at an angle slightly greater than that of the side walls 26 of the cutting insert.

To change cutting edges, the insert is released by removing screw 18 and top clamp 16. This permits insert 12 to be lifted upwardly out of recess 14 and rotated one hundred and twenty degrees to bring a new cutting edge into position. The insert is then dropped back into place within the recess and the clamp 16 and screw 18 is reassembled to secure it in place.

Figure 4:
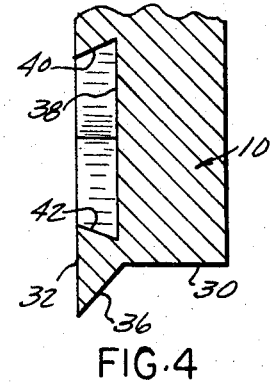
FIG. 4 is a top sectional view taken in the direction of arrows 4—4 of FIG. 2.

As can be seen from FIG. 4, in particular, the undercut shoulders 40 and 42 prevent lateral movement of the insert, and thereby permit the insert to be removed only when lifted upwardly out of the recess. Since the cutting force produced by the engagement of a workpiece by the cutting insert is directed downwardly, it can be seen that the forward projection 36 of tool holder 10 and the shape of recess 14 resist all deflection of the insert in this direction.

Since any lateral deflection of the cutting insert is prevented by side face 32 of the tool holder or the undercut shoulders 40 and 42, and since the downward resultant cutting force is completely resisted by forward projection 36 of the tool holder and the shape of recess 14, it can be seen that under normal conditions no further restraining or clamping means is necessary to retain insert 12 in the tool holder. However, since tool bit chattering is occasionally encountered under some circumstances, it becomes desirable to provide a means for resisting any upward force on the cutting insert. It is for this purpose that top clamp 16 is provided. The underface 48 of clamp 16 is preferably inclined at silghtly more than eleven degrees, so that it not only exerts a downward force on the cutting insert, but will also provide additional resistance to any lateral force toward the left as viewed in FIG. 2, as do the undercut shoulders 40 and 42.

While the invention has been illustrated as employed with a triangularly-shaped insert, it could similarly be utilized with square or other shaped inserts, with appropriate modifications in the shape of the recess.

Thus, the tool holder of this invention provides a simple yet positive means for retaining in place a throwaway type cutting insert. The shape of the insert-receiving recess itself provides all of the clamping force necessary to resist normally encountered cutting forces.

This invention may be further developed within the scope of the following claims. Accordingly, the above specification is to be interpreted as illustrative of only a single operative embodiment of this invention, rather than in a strictly limited sense.

I now claim:

1. A cutting tool comprising a horizontally elongated, rectangular in cross-section tool holder having a front face, a vertical side face, and an upper face;

an upwardly opening V-shaped recess cut into said side face and forming a flat, vertical recess wall parallel, to but spaced inwardly of the plane of said side face, with one leg of the V extending upwardly and forwardly of the tool holder and terminating at said front face considerably below said upper face so that the recess is open forwardly as well as upwardly and sidewise, and with the other leg of the V extending upwardly and rearwardly of the tool holder and terminating at said upper face;

the edges defining said legs each being flat and uniformly sloped inwardly to form in cross-section a continuous, uniform acute angle inside the recess between the flat recess wall and said edges so that the recess gradually widens from the tool holder vertical side face towards the recess wall;

a replaceable cutting tool insert formed of a flat, substantially equilateral triangular shaped plate of a hard, brittle metal, each of whose corners forms a cutting tip, with the three edges of said insert being substantially flat and bevelled towards one face of the insert at an angle corresponding to the slope of the edges defining said legs;

said edges defining said recess legs being approximately as wide as the thickness of the plane and the two legs intersecting at an angle substantially equal to the angles of intersections between the edges of the cutting tool insert;

said insert being vertically arranged within the recess with said one of its faces in full face to face contact with said recess wall and with two of its edges in full face to face contact with the full length of the two edges defining said legs and with one corner thereof being exposed and extending forwardly of the tool holder front face;

a downwardly opening releasable clamp member secured to said upper face and having a narrow clamping edge forming a narrow line contact with the upper edge of the insert, wherein said insert is jammed downwardly and towards and against the recess wall by the clamp and the cooperating sloped and bevelled edges and cutting forces applied to said exposed corner;

and whereby said insert may be released and rotated to successively expose each corner as the corners wear out and may be replaced with a new insert of approximately, but not necessarily exactly, the same thickness and edge lengths, so that inaccuracies and slight variations of size of the inserts are accommodated by the inserts extending a variable distance outwardly or inwardly of the side, upper and forward openings of the recess.

2. A cutting tool as defined in claim 1 and including a forwardly projecting, integral portion, coplanar with said tool holder vertical side face, formed on said front face and being equal in width to the width of the edges defining said V-shaped legs, with the upper edge of said portion forming a continuation of the edge defining said forwardly extending leg for thereby supporting the underside of said exposed insert corner portion almost to its tip.

References Cited

UNITED STATES PATENTS

| | | | |
|---|---|---|---|
| 1,843,549 | 2/1932 | Firth | 29—96 X |
| 2,838,827 | 6/1958 | Wright | 29—96 |
| 3,045,322 | 7/1962 | Hertel | 29—96 |
| 3,124,864 | 3/1964 | Frommelt | 29—96 |
| 3,180,006 | 4/1965 | Emmons | 29—97 |

FOREIGN PATENTS 1,204,054    8/1959    France.

HARRISON L. HINSON, *Primary Examiner.*

U.S. Cl. X.R.

29—95